United States Patent Office 2,834,743
Patented May 13, 1958

2,834,743

SOLUTION OF α-CHLORO-ACRYLONITRILE POLYMERS IN NITROMETHANE SOLVENT MIXTURE AND METHOD OF MAKING

Heinz Peter Basch, Sutton, England, assignor to The Distillers Company Limited, Edinburgh, Scotland, a British company No Drawing. Application January 12, 1954
Serial No. 403,635

Claims priority, application Great Britain
February 7, 1953

5 Claims. (Cl. 260—29.6)

The present invention relates to new compositions comprising solutions of alpha-chloroacrylonitrile polymers. In particular it relates to liquid compositions from which fibres may be spun.

It has been found that α-chloroacrylonitrile polymers, by which term is meant poly-α-chloroacrylonitrile and copolymers of a α-chloroacrylonitrile with other copolymerisable monomers, are useful in the production of films, fibres and other shaped articles. Poly-α-chloroacylonitrile and copolymers containing at least 85% of α-chloroacrylonitrile units in their molecular structure are particularly suitable for the production of fibers with good physical characteristics. In the production of films, fibres, and the like, it is convenient to dissolve the polymer in a suitable solvent and either cast the film or make the fibre from the solution thus produced. However, α-chloroacrylonitrile polymers are only readily soluble in a limited number of solvents and, furthermore, such solutions as can be obtained are frequently not stable in that the dissolved α-chloroacrylonitrile polymer decomposes and undergoes degradation on standing. Such degradation is indicated by a drop in the viscosity of the solution and frequently by the discolouration of the solution. It will, of course, be obvious that solutions of α-chloroacrylonitrile polymers in which the latter undergo decomposition cannot be used successfully for the production of films or fibres because such films or fibres, if obtainable at all, would be weakened owing to the lower molecular weight of the degraded polymer and by the presence therein of the decomposition or degradation products. Such films would also be discoloured by the presence therein of the decomposition and degradation products.

An object of the present invention is to provide a solution of an alpha-chloroacrylonitrile polymer in which the polymer is substantially stable over a sufficient range of temperatures to enable useful films, fibres and other shaped articles to be produced therefrom. A further object of the present invention is to provide a polymer solution particularly adapted for the production of fibres both by the wet and dry spinning techniques.

According to copending British application No. 3507/53 filed February 7, 1953 (corresponding to copending application, Ser. No. 405,046, filed Jan. 19, 1954), substantially stable solutions of α-chloroacrylonitrile polymers may be prepared by dissolving the polymer in nitromethane. Such solutions are generally useful for the production of films and fibres, but in certain instances and particularly in the production of fibres by the various spinning techniques, it is often desirable to use solutions of greater concentration than can be obtained by the direct solution of the polymer in pure nitromethane.

It has now been discovered that the solubility of α-chloroacrylonitrile polymers and particularly of poly-α-chloroacrylonitrile, in nitromethane may be considerably increased by the addition thereto of a phenol or a nuclear homologue thereof and/or of water. The addition of either water or a phenol individually to the nitromethane leads in both cases to a mixture with increased solvent power, and when both are added to the nitromethane, a ternary mixture is obtained in which mixture the increase in solvent power is much greater than the added effects of the water and phenol when added separately.

Accordingly the present invention provides a composition comprising an α-chloroacrylonitrile polymer, as hereinbefore defined, dissolved in a solvent mixture comprising nitromethane mixed with a phenol, as hereinafter defined, and/or water.

By the term "a phenol" is meant phenol ($C_6H_5OH$) or a nuclear homologue thereof, such as is obtained from phenol by the substitution of one or more hydrogen atoms on the nucleus thereof with a lower alkyl group containing 1 to 4 carbon atoms and/or the substitution of one nuclear hydrogen atom by a hydroxyl group. Examples of such nuclear homologues are the xylenols, the cresols, the propyl phenols, the butyl phenols and resorcinol.

The α-chloroacrylonitrile polymers which are used in the formation of the compositions of the present invention may be poly-α-chloroacrylonitrile or copolymers of α-chloroacrylonitrile with other copolymerisable monomeric compounds, said copolymers preferably containing a major proportion of α-chloroacrylonitrile units in their molecular structures. Examples of such polymerisable monomeric compounds are compounds containing on or more ethylenic linkages as, for instance, vinyl acetate, vinyl chloride, acrylic acid and its esters and homologues, maleic and fumaric esters, vinyl pyridine, vinylidene chloride, styrene, isobutene, butadiene, copolymerisable vinyl and acrylic compounds generally and polymerisable olefinic and diolefinic hydrocarbons generally.

The α-chloroacrylonitrile polymers may be made by any suitable polymerisation process. The novel compositions of the present invention are particularly useful for the production of films or fibres when they are substantially colourless and, therefore, it is preferred to prepare the compositions from substantially colourless or pale-coloured α-chloroacrylonitrile polymers, which may be prepared according to the process set forth in copending British application No. 4345/53 filed February 17, 1953 (corresponding to copending application, Ser. No. 407,563, filed Feb. 1, 1954). Briefly stated such process comprises polymerising in aqueous dispersion monomeric material comprising α-chloroacrylonitrile in the absence of free molecular oxygen and in the presence of a peroxidic catalyst and a polyfunctional, polymeric dispersing agent, the pH of the aqueous phase of the dispersion being below 7. Examples of suitable dispersing agents include gelatin, polyacrylic acid, polymethacrylic acid, alginic acid, gum tragacanth, agar-agar, glycol, cellulose, carboxymethyl cellulose, starch and maleic acid-vinyl acetate and maleic acid-styrene copolymers.

The α-chloroacrylonitrile polymer may be dissolved in the solvent mixtures of the present invention by any suitable means, for instance the polymer may be finely divided and distributed throughout the solvent mixture by mechanical agitation, until solution occurs. The rate of solution may be increased by heating the solvent muixture to an elevated temperature and the total quantity of polymer which can be dissolved, may be increased by raising the temperature of the solution. It has been found that, with poly-α-chloroacrylonitrile, solutions according to the present invention may be formed up to temperatures of 70° C. without appreciable degradation of the polymer occurring.

The solvent mixtures used in the preparation of the novel compositions of the present invention comprise nitromethane mixed with a phenol and/or water. Binary mixtures comprising nitromethane mixed with either a phenol or water, show increased solvent power for $\alpha$-chloroacrylonitrile polymers, those containing a phenol showing the most marked improvement. It will be appreciated that the range of solvent mixtures comprising nitromethane and water is limited by the solubility of water in nitromethane at the temperature (pressure) of the solution. If excess quantities of water are added, two phase systems, which are of no great practical utility, result. Depending on the temperature and pressure employed, homogeneous nitromethane-water solvent mixtures containing up to 20% of water may be obtained.

With nitromethane-phenol solvent mixtures the ratio of the two components may be widely varied to give solvent mixtures with varying solvent power characteristics. However, it is preferred that the ratio by weight of nitromethane to the phenol shall not be less than 1:1. Apart from the solubility characteristics of the resultant mixture, this limitation of the proportion of nitromethane to phenol is preferred because, when the resultant $\alpha$-chloroacrylonitrile polymer solution is used for the preparation of fibres, the phenol component of the mixture has to be substantially removed from the fibres before they can become commercially useful and it is, therefore, further preferred that the concentration of the phenol in the solvent mixtures shall be as low as possible having regard for the solvent power which it is desired that the mixture should possess.

The preferred compositions according to the present invention are those prepared from ternary solvent mixtures comprising nitromethane, a phenol and water. As with the binary nitromethane-phenol solvent mixtures, it is preferred to keep the proportion of the phenol present therein as low as possible having regard for the solvent power which it is desired that the mixture should possess. In general a ratio by weight of nitromethane to phenol of not less than 1:1 is suitable and, when phenol itself ($C_6H_5OH$) is one component of the ternary solvent mixture, the preferred ratio is in the range of 3:1 to 30:1.

The proportion of water in the ternary mixture may be advantageously increased up to the point of maximum solubility of the water in the nitromethane-phenol mixture. Thereafter the addition of more water to the ternary mixture makes it become heterogeneous and should, therefore, be avoided. The point at which the ternary mixture becomes heterogeneous will, of course, vary with the ratio of the nitromethane to the phenol and with the temperature and pressure applied to the mixture. It is preferred to use an amount of water in the mixture less than that necessary to cause the mixture to become heterogeneous, so that in use there is no tendency for the mixture to form two layers. When the ternary mixture comprises nitromethane, phenol ($C_6H_5OH$) and water in which the nitromethane-phenol ratio is in the range by weight 3:1 to 30:1, the amount of water in the mixture may lie in the range 20% to 0.1% by weight on the total ternary mixture and is preferably in the range 5% to 1%.

The concentration of the $\alpha$-chloroacrylonitrile polymers in the compositions of the present invention may be varied considerably. Compositions having the greatest concentration of polymer, for instance as high as 40%, are obtained by using ternary solvent mixtures (the percentage of polymer being expressed here and subsequently as grams of polymer per 100 mls. of solvent mixture used). Of the binary solvent mixtures, those containing a phenol have generally greater solvent powers than those containing water. It will, of course, be appreciated that the solvent power of a solvent mixture will depend not only on the nature of the mixture, but also on the molecular weight of the polymer. Moreover, it should be noted that copolymers of $\alpha$-chloroacrylonitrile are generally more soluble than homopolymers of approximately the same molecular weight.

Fibres may be formed from the novel compositions of the present invention by any of the wet or dry spinning techniques known in the art. For instance, in a typical wet spinning process the novel composition of the present invention containing, for example, 8–40%, and preferably 15 to 30% by weight of a suitable polymer is forced through a spinnerette into a precipitating or coagulating liquid, whereupon the fibre is formed and the excess solvent diffuses away into the precipitating or coagulating bath. The fibre as formed is wound up on a rotating drum which is suitably positioned so that the fibre travels for a suitable distance through the coagulating solution and, if desired, through other solutions which may wash or further treat the formed fibre. Suitable precipitating or coagulating liquids are water and alcohols and mixtures thereof. The nature of the formed fibre may also be varied by regulation of the temperature at which the wet spinning process is carried out in conjunction with the precipitating liquid used. For instance, good fibres may be produced from an 8–30% solution of suitable poly-$\alpha$-chloroacrylonitrile in a nitromethane-phenol-water ternary mixture according to the present invention by spinning the solution into ethyl alcohol at about 20° C. or into water at about 80° C.

In a typical dry spinning procedure the fibres may be formed by extruding a composition of the present invention into a gaseous atmosphere whose temperature is sufficient to cause the evaporation of the solvents and is not so great as to cause decomposition of the formed fibre during that period for which the fibre is exposed to the heated gas. Poly-$\alpha$-chloroacrylonitrile of a suitable molecular weight may be spun into fibres by this technique most suitably by spinning a composition according to the present invention comprising an 8–30% solution of the polymer into the top of a vertical tower up which air at about 150° C. is passing. The formed fibres are wound on to a drum at the bottom of the tower.

It has been observed that the compositions of the present invention attack brass with the formation of a coloured solution and, therefore, high quality fibres cannot be spun from spinning cells made of brass. It is preferred to use spinning cells made of stainless steel for the production of fibres from the composition of the present invention, but other suitable metals may be employed.

The following examples illustrate the production and stability of the novel compositions of the present invention and the production therefrom of fibres.

*Example 1*

Three compositions according to the present invention were prepared by dissolving 0.5 gram of a poly-$\alpha$-chloroacrylonitrile polymer in 10 cc. portions of the following solvent mixtures:

(a) 40 cc. nitromethane+1.2 cc. water
(b) 40 cc. nitromethane+12 g. phenol
(c) 40 cc. nitromethane+1.2 cc. water+12 g. phenol In all cases clear homogeneous stable solutions were obtained, the rate of solution being greatest in the case of solvent mixture (c) and least in the case of solvent mixture (a). This shows that the ternary solvent mixture (c) has the greatest solvent power for the polymer and the binary mixture (a) has the least.

An attempt to dissolve 0.5 gram of the same polymer in 10 cc. of pure nitromethane only gave rise to a cloudy non-homogeneous dispersion in which the polymer had not completely dissolved.

*Example 2*

A finely divided homopolymer of $\alpha$-chloroacrylonitrile of suitable molecular weight for spinning was prepared by an aqueous dispersion polymerisation procedure. 0.5 gram of this polymer dissolved rapidly in 10 cc. of a ternary solvent mixture prepared according to the formula: 40 grams nitromethane, 12 grams phenol and 1.2 cc. of water. The solution so obtained was clear and homogeneous and no degradation of the polymer took place on standing.

*Example 3*

0.5 gram of the poly-α-chloroacrylonitrile used in Example 2 rapidly dissolved in 10 cc. of a ternary solvent mixture prepared according to the formula: 40 grams nitromethane, 12 grams meta-cresol and 1.2 cc. of water, to give a clear homogeneous solution.

When 0.5 gram of the same polymer as used in Examples 2 and 3 was dispersed in 10 cc. of nitromethane only slow solution of the polymer occurred and the final solution obtained remained cloudy.

Similar solutions are obtained by replacing the meta-cresol employed in Example 3 either wholly or in part with other lower alkylphenols such as para- or ortho-cresol, any of the xylenols, the n-propyl substituted phenols or the n-butyl substituted phenols, or resorcinol.

*Example 4*

0.5 gram of a finely divided copolymer of α-chloroacrylonitrile and ethyl maleate containing 99 mole percent alpha-chloroacrylonitrile units in its molecular structure, was added to 10 cc. of a ternary solvent mixture prepared according to the formula: 40 grams nitromethane, 12 grams phenol and 1.2 cc. water. On warming the copolymer dissolved rapidly to give a clear homogeneous solution from which films of the copolymer could be readily prepared.

Similar solutions were prepared by replacing the copolymer used above with the same quantities of (1) an α-chloroacrylonitrile methyl acrylate copolymer containing 81.4 mole percent of α-chloroacrylonitrile units, (2) an α-chloroacrylonitrile-ethyl fumarate copolymer containing 95 mole percent of α-chloroacrylonitrile units and (3) an α-chloroacrylonitrile-styrene copolymer containing 52.7 mole percent of α-chloroacrylonitrile units. In all cases the copolymers dissolved rapidly to give clear homogeneous solutions.

*Example 5*

0.5 gram of poly-α-chloroacrylonitrile was dissolved in 100 cc. of a ternary solvent mixture consisting of 114 grams of nitromethane, 30 grams of phenol ($C_6H_5OH$) and 3 grams of water. The stability of the polymer in this solution was then determined by measuring its specific viscosity both before and after it had stood for a given period of time at a controlled temperature; no change of viscosity indicates that no degradation of the dissolved polymer has occurred.

After 60 minutes at 46° C., the viscosity of solution was substantially unaltered and similarly after 20 minutes at 70° C. no appreciable change in viscosity was observed. Thus it can be seen that there is no degradation of poly-α-chloroacrylonitrile in the solvent mixture under the above conditions.

*Example 6*

5 grams of finely divided poly-α-chloroacrylonitrile were mixed with 40 grams of nitromethane, 12 grams of phenol ($C_6H_5OH$) and 1.2 cc. of water and the mixture stirred while warmed to 70° C. A smooth light brown solution resulted which was transferred to a stainless steel spinnerette cell which was maintained at 70° C. A nitrogen pressure of 100 p. s. i. was applied to the spinnerette and a jet of solution forced into a tower in which hot air was circulating, the air temperature at the top being 160° C. and at the bottom 130° C. In this way it was possible to form a continuous substantially white fibre which was wound on to a drum at the bottom of the tower.

*Example 7*

A solution similar to that described in Example 6 was placed in a spinnerette cell which was immersed in water at 85° C. A pressure of 50 p. s. i. of nitrogen was applied to the top of the cell and a fibre drawn from the spinnerette hole and wound up on a drum of suitable diameter.

I claim:

1. A composition comprising an α-chloroacrylonitrile polymer containing at least 85% of α-chloroacrylonitrile units in its molecular structure dissolved in a nitromethane solvent mixture, said mixture having as its second component a compound selected from the group consisting of water, a mononuclear phenol having not more than ten carbon atoms in the molecule and mixtures thereof.

2. A process for the production of a composition as claimed in claim 1, which comprises dissolving the α-chloroacrylonitrile polymer in the solvent mixture at a temperature not exceeding 70° C.

3. A composition comprising an α-chloroacrylonitrile polymer containing at least 85% of α-chloroacrylonitrile units in its molecular structure, dissolved in a nitromethane solvent mixture, said mixture having as second component a mononuclear phenol having not more than ten carbon atoms in the molecule and the ratio by weight of nitromethane to the phenol being not less than 1:1.

4. A composition comprising an α-chloroacrylonitrile polymer containing at least 85% of α-chloroacrylonitrile units in its molecular structure, dissolved in a ternary nitromethane:phenol:water solvent mixture, wherein the phenol is $C_6H_5OH$ and the nitromethane:phenol ratio is in the range of 3:1 to 30:1 by weight.

5. A compositon comprising an α-chloroacrylonitrile polymer containing at least 85% of α-chloroacrylonitrile units in its molecular structure, dissolved in a ternary nitromethane:phenol:water solvent mixture, wherein the phenol is $C_6H_5OH$ and the nitromethane:phenol ratio is in the range of 3:1 to 30:1 by weight, and the amount of water present is in the range of 5% to 1% by weight on the total ternary mixture.

References Cited in the file of this patent

UNITED STATES PATENTS

| | | |
|---|---|---|
| 2,658,879 | Beaman | Nov. 10, 1953 |
| 2,671,072 | Ham et al. | Mar. 2, 1954 |
| 2,679,492 | Hampson et al. | May 25, 1954 |

OTHER REFERENCES

"Vinyl and Related Polymers," by C. E. Schildknecht, page 271, published 1952 by Wiley & Sons.